United States Patent
Schroeder genannt Berghegger et al.

(10) Patent No.: US 12,474,285 B2
(45) Date of Patent: Nov. 18, 2025

(54) CLOSED-MESHED ENERGY MEASUREMENT IN THE GAS NETWORK

(71) Applicant: Honeywell International, Inc., Charlotte, NC (US)

(72) Inventors: Ralf Schroeder genannt Berghegger, Glandorf (DE); Christian Lampe-Juergens, Spelle (DE); Guido Temme, Bad Iburg (DE); Tobias Meimberg, Emden (DE); Bradley Robert Visser, Aargau (CH); Florian Severin Krischker, Aargau (CH); Andreas Kempe, Zurich (CH)

(73) Assignee: Honeywell International, Inc., Charlotte, NC (US)

(*) Notice: Subject to any disclaimer, the term of this patent is extended or adjusted under 35 U.S.C. 154(b) by 329 days.

(21) Appl. No.: 18/185,772

(22) Filed: Mar. 17, 2023

(65) Prior Publication Data
US 2024/0310311 A1    Sep. 19, 2024

(51) Int. Cl.
*G01N 25/18* (2006.01)
*G01F 1/667* (2022.01)
(Continued)

(52) U.S. Cl.
CPC ............... *G01N 25/18* (2013.01); *G01N 7/00* (2013.01); *G01F 1/668* (2013.01); *G01N 29/024* (2013.01);
(Continued)

(58) Field of Classification Search
CPC ........ G01N 25/18; G01N 7/00; G01N 29/323; G01N 29/326; G01N 33/225;
(Continued)

(56) References Cited

U.S. PATENT DOCUMENTS 4,059,982 A * 11/1977 Bowman ............... G01F 1/6986
73/204.17
6,047,589 A    4/2000 Hammond et al.
(Continued)

FOREIGN PATENT DOCUMENTS

CN    106840292 A    6/2017
CN    109839161 A    6/2019
(Continued)

*Primary Examiner* — Peter J Macchiarolo
*Assistant Examiner* — John M Royston
(74) *Attorney, Agent, or Firm* — John Maldjian, Esq.; Stevens & Lee PC

(57) ABSTRACT

A method includes receiving a gas or gas mixture through a flow sensor. A flow velocity, volumetric, or mass flow are determined. The method also includes determining a sound velocity of the gas or gas mixture by an ultrasonic sensor. A density of the gas or gas mixture is correlated from the sound velocity. The method also includes positioning a microthermal sensor in an area with less flow or no flow of the gas or gas mixture. A thermal conductivity and thermal diffusivity of the gas or gas mixture at the one or more temperatures is determined. The method also includes connecting a processor to the microthermal sensor to calculate an energy of the gas or gas mixture based on a calorific value, the temperature and the volume or mass flow. Specific quantities for gas quality are correlated.

20 Claims, 6 Drawing Sheets

(51) Int. Cl.
  *G01N 7/00* (2006.01)
  *G01N 29/024* (2006.01)
  *G01N 29/32* (2006.01)
  *G01N 29/44* (2006.01)
  *G01N 33/22* (2006.01)

(52) U.S. Cl.
  CPC ......... *G01N 29/323* (2013.01); *G01N 29/326* (2013.01); *G01N 29/4472* (2013.01); *G01N 33/225* (2013.01); *G01N 2291/021* (2013.01); *G01N 2291/02818* (2013.01); *G01N 2291/02836* (2013.01)

(58) Field of Classification Search
  CPC ... G01N 2291/021; G01N 2291/02818; G01N 2291/02836; G01N 29/4472; G01N 29/024; G01F 1/668
  USPC .......................................................... 73/232
  See application file for complete search history.

(56) References Cited

U.S. PATENT DOCUMENTS

| | | |
|---|---|---|
| 7,091,509 B2 | 8/2006 | Rahmouni et al. |
| 7,399,118 B2 * | 7/2008 | Matter .................. G01F 15/046 73/23.31 |
| 9,612,229 B2 | 4/2017 | Pretre et al. |
| 10,101,285 B2 | 10/2018 | Hepp et al. |
| 10,371,678 B2 | 8/2019 | Pretre et al. |
| 10,782,168 B2 | 9/2020 | Skelding |
| 11,112,340 B2 | 9/2021 | Huber et al. |
| 2016/0138951 A1 * | 5/2016 | Pretre ...................... G01N 9/00 702/24 |
| 2020/0041479 A1 | 2/2020 | Huber et al. |
| 2021/0388985 A1 * | 12/2021 | Hornung ................ F23N 5/025 |

FOREIGN PATENT DOCUMENTS

| | | |
|---|---|---|
| EP | 1227305 A1 | 7/2002 |
| EP | 1310775 A1 | 5/2003 |
| EP | 1327865 A1 | 7/2003 |
| EP | 2574918 B1 | 4/2013 |
| EP | 3021117 A1 | 5/2016 |
| EP | 3153854 B1 | 4/2017 |
| EP | 3502687 A1 | 6/2019 |
| EP | 3610250 B1 | 9/2020 |
| JP | 2004279126 A | 10/2004 |
| JP | 2010237006 A | 10/2010 |
| JP | 2012083276 A | 4/2012 |
| JP | 5389502 B2 | 1/2014 |
| JP | 5709159 B2 | 4/2015 |
| WO | 2018185008 A1 | 10/2018 |
| WO | 2019122292 A1 | 6/2019 |

* cited by examiner

100

CLOSED-MESHED ENERGY MEASUREMENT IN THE GAS NETWORK

TECHNICAL FIELD

The present disclosure generally relates to closed-meshed energy measurement in a gas network for a gas or gas mixture by correlating the calorific value with an ultrasonic sensor, a flow cell and a microthermal sensor.

BACKGROUND

In the current state of art, two measuring devices are used to measure the consumed gas energy in private houses or industry areas. A gas meter for the volume and an additional device is used to calculate the calorific value. The combination of both values is used to calculate the consumed energy in kilowatt hours (kWh). The bill can be provided in American dollars or European Euros.

However, a disadvantage with the two measuring devices is that the measuring device for the calorific value, such as a gas chromatograph is expensive and far away from the gas meter. As a result, incorrect billing can occur when the gas properties are different between the two measuring devices. Further, this problem is likely to continue to happen with current trends of injecting biogas, LPG, or hydrogen.

Another disadvantage is to have two devices with separate formula afterward in contrast to one device with a final output being directly at the gas consuming consumer.

Accordingly, a need exists for a cheaper way of measuring the consumed gas and gas quality. Moreover, a need exists for a less expensive way of measuring the gas for volume and to calculate the calorific value. Further, a need exists to not have the need for two measuring devices, to have any measuring taking place far away from the gas meter.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

The aforementioned aspects and other objectives can now be achieved as described herein.

In an embodiment, a method includes receiving a gas or gas mixture through a flow sensor. A flow velocity or volumetric flow are determined and a temperature (T) and a pressure (p) of the gas or gas mixture are detected. The method also includes determining a sound velocity (cs) of the gas or gas mixture by an ultrasonic sensor. A density (r) of the gas or gas mixture is correlated from the sound velocity (cs) or is calculated with the pressure (p) and the sound velocity (cs). The method also includes positioning a microthermal sensor in an area with less flow or no flow of the gas or gas mixture. A thermal conductivity (l) of the gas or gas mixture at one or more temperatures is determined with the microthermal sensor. A thermal diffusivity (a) of the gas or gas mixture at one or more temperatures is determined with the microthermal sensor. The method also includes connecting a processor to the microthermal sensor to calculate an energy of the gas or gas mixture based on a calorific value, the temperature, and the volume or mass flow. Specific quantities for gas quality in relation to the calorific value of the gas or gas mixture are correlated from the density (r), thermal conductivity (l), and thermal diffusivity (a) of the gas or gas mixture.

In an embodiment of the invention, a system comprises a flow sensor receiving a gas or gas mixture. A flow velocity or volumetric flow are determined and a temperature (T) and a pressure (p) of the gas or gas mixture are detected. The system also includes an ultrasonic sensor determining a sound velocity (cs) of the gas or gas mixture. A density (r) of the gas or gas mixture is correlated from the sound velocity (cs) or is calculated with the pressure (p) and the sound velocity (cs). The system also includes a microthermal sensor positioned in an area with less flow or no flow of the gas or gas mixture. A thermal conductivity (l) of the gas or gas mixture at one or more temperatures is determined with the microthermal sensor. A thermal diffusivity (a) of the gas or gas mixture at one or more temperatures is determined with the microthermal sensor. The system also includes a processor connected to the microthermal sensor to calculate an energy of the gas or gas mixture based on the calorific value, the temperature (T), and the volume or flow. Specific quantities for gas quality in relation to the calorific value of the gas or gas mixture is correlated from the density (r), the thermal conductivity (l) and the thermal diffusivity (a) of the gas or gas mixture.

BRIEF DESCRIPTION OF THE FIGURES

The accompanying figures, in which like reference numerals refer to identical or functionally similar elements throughout the separate views and which are incorporated and form a part of the specification, further illustrate the present invention and, together with the detailed description of the invention, serve to explain the principles of the present invention.

Figure 1:
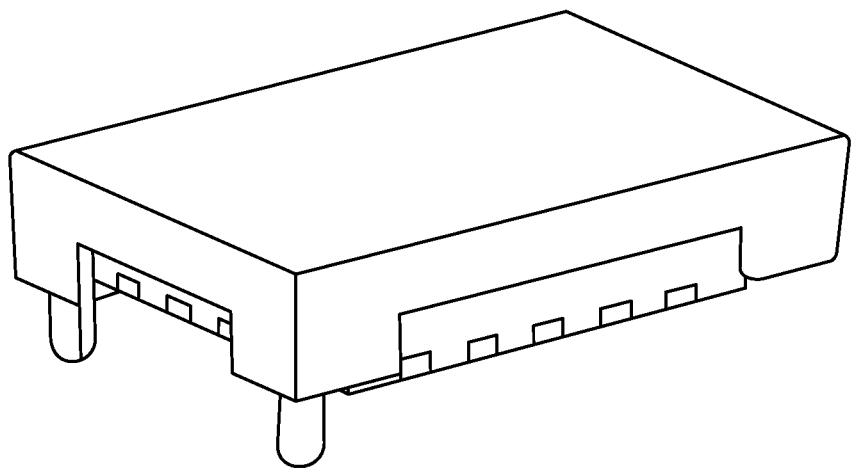
FIG. 1 illustrates a schematic diagram in accordance with an embodiment of the invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., Mars Inc. v. H.J. Heinz Co., 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ."

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

Introduction

Embodiments of the present invention include a system that provides an improvement on prior systems. A flow sensor will be connected to the system and the gas or gas mixture will flow through the flow sensor. An ultrasonic sensor is part of the flow sensor or is connected separately. A microthermal sensor will be positioned in an area with reduced or no flow of the gas or gas mixture and the flow through the microthermal sensor may not proportional to the flow through the flow sensor.

The flow sensor will determine a flow velocity and volumetric or mass flow. The system may also determine a temperature (T) and a pressure (p) of the gas or gas mixture. The ultrasonic sensor will determine a sound velocity (cs) of the gas or gas mixture. The density (r) of the gas or gas mixture will be correlated from the sound velocity (cs). Alternatively, the density (r) of the gas or gas mixture is calculated with the pressure (p) and the sound velocity (cs).

The microthermal sensor will be configured in an area with less flow or no flow of the gas or gas mixture. The microthermal sensor will determine a thermal conductivity (l) at one or more temperatures in a steady state. In addition, the microthermal sensor determines the thermal diffusivity (a) at one more temperatures in a dynamic state.

A processor will be connected to the microthermal sensor. The processor will calculate an energy of the gas or gas mixture based on a calorific value, the temperature (T), and the volume or mass flow. The quality of the gas or gas mixture is also determined. Specific quantities for the gas quality in relation to the calorific value of the gas or gas mixture is correlated from the density (r), thermal conductivity (l), and the thermal diffusivity (a) of the gas or gas mixture.

System Structure

FIG. 1 illustrates a microthermal sensor 100. The microthermal sensor 100 will be part of a system that receives a gas or gas mixture. The system will identify the gas quality and energy of the gas or gas mixture. The microthermal sensor 100 will be positioned in an area with reduced or no gas flow of the gas or gas mixture. The microthermal sensor 100 will identify a thermal conductivity (l) of the gas or gas mixture at one or more temperatures. In relation to a heating pulse, the temperatures of the gas or gas mixture can be in a steady state when the thermal conductivity (l) of the gas or gas mixture is measured. The microthermal sensor 100 will also identify a thermal diffusivity (a) of the gas or gas mixture at one or more temperatures. In relation to a heating pulse, the one or more temperatures of the gas or gas mixture will be in a dynamic state. The one or more temperatures of the gas or gas mixture will be increasing or deceasing when the microthermal sensor 100 identifies the thermal diffusivity (a). As such, when the gas or gas mixture flows into the flow sensor, the microthermal sensor will identify the thermal conductivity (l) and thermal diffusivity (a) of the gas or gas mixture.

Figure 2:
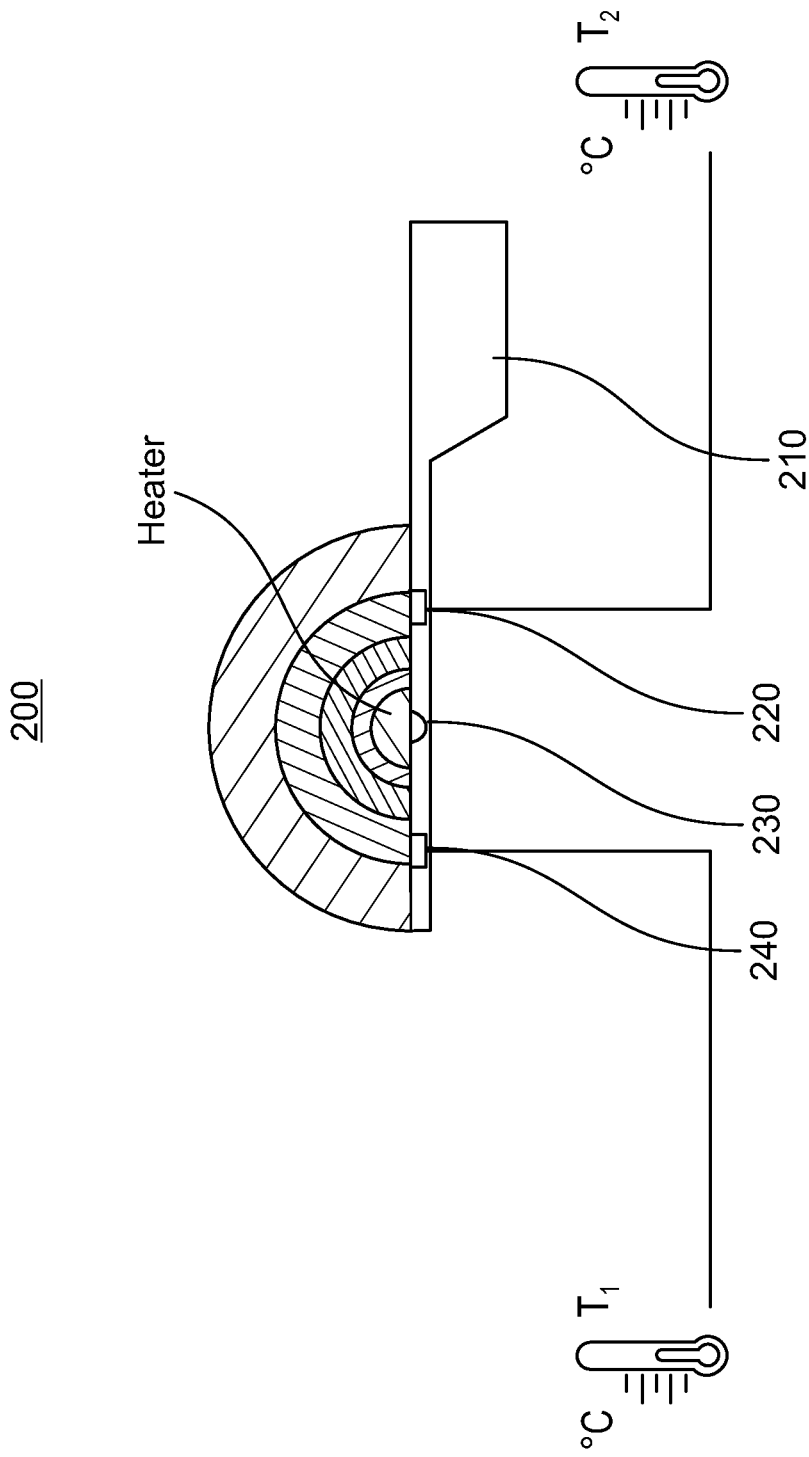
FIG. 2 illustrates a front view of a portion of a device in accordance with an embodiment of the invention.

In FIG. 2, further detail of the microthermal sensor 200 is illustrated. A heater will be positioned within the microthermal sensor. In addition heat sensors 220, 240 will be positioned around a heater 230. The heat sensors 220, 240 will be utilized to identify one or more temperatures of the gas or gas mixture. The heater 230 within the microthermal sensor 200 will heat up by one or several heating pulses. The heat sensors 220, 240 positioned around the heater 230 will identify the one or more temperatures of the gas or gas mixture. The temperature of the gas or gas mixture can be in a dynamic state, in which the one or more temperatures are increasing or deceasing. The microthermal sensor 200 will identify the thermal diffusivity (a) of the gas or gas mixture when the one or more temperatures are in the dynamic state and in relation to one or several heating pulses. When the one or more temperatures are in a steady state, the one or more temperatures can remain constant. In the steady state, the microthermal sensor 200 will identify the thermal conductivity (l) of the gas or gas mixture.

Figure 3:
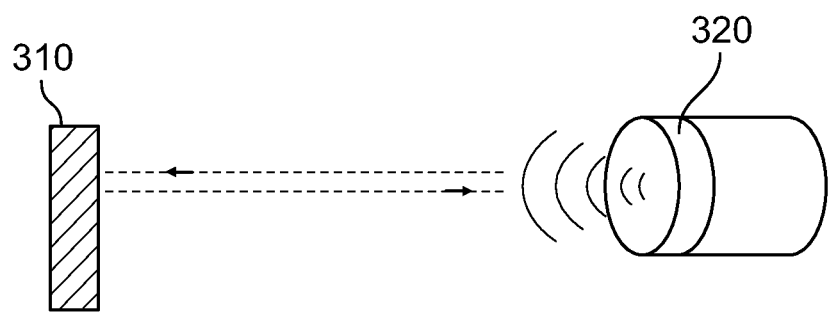
FIG. 3 illustrates a view of an ultrasonic sensor in accordance with an embodiment of the invention.

Referring to FIG. 3, an aspect of an ultrasonic sensor 300 is shown. The gas or gas mixture will also be measured by the ultrasonic sensor 300. The ultrasonic sensor 300 will measure the time of flight, which is in relation to the sound velocity (cs) of the gas or gas mixture. Moreover, a density (r) of the gas or gas mixture is correlated from the sound velocity (cs) or is calculated with the pressure (p) and the sound velocity (cs) of the gas or gas mixture. As the gas or gas mixture is around the ultrasonic sensor 300, the ultrasonic sensor 300 will measure the sound velocity (cs) of the gas or gas mixture. A transducer 320 will send out waves through the gas or gas mixture onto an ultrasonic mirror 310 (e.g. a hard surface). The mirror 310 will reflect the emitted waves through the gas or gas mixture back toward the transducer 320. The speed of sound is determined with the ultrasonic sensor 300 by measuring the travel time of the sound from the transducer 320 to the mirror 310 and back to the transducer 320 and dividing it by twice the distance between the transducer 320 and the mirror 310.

Figure 4:
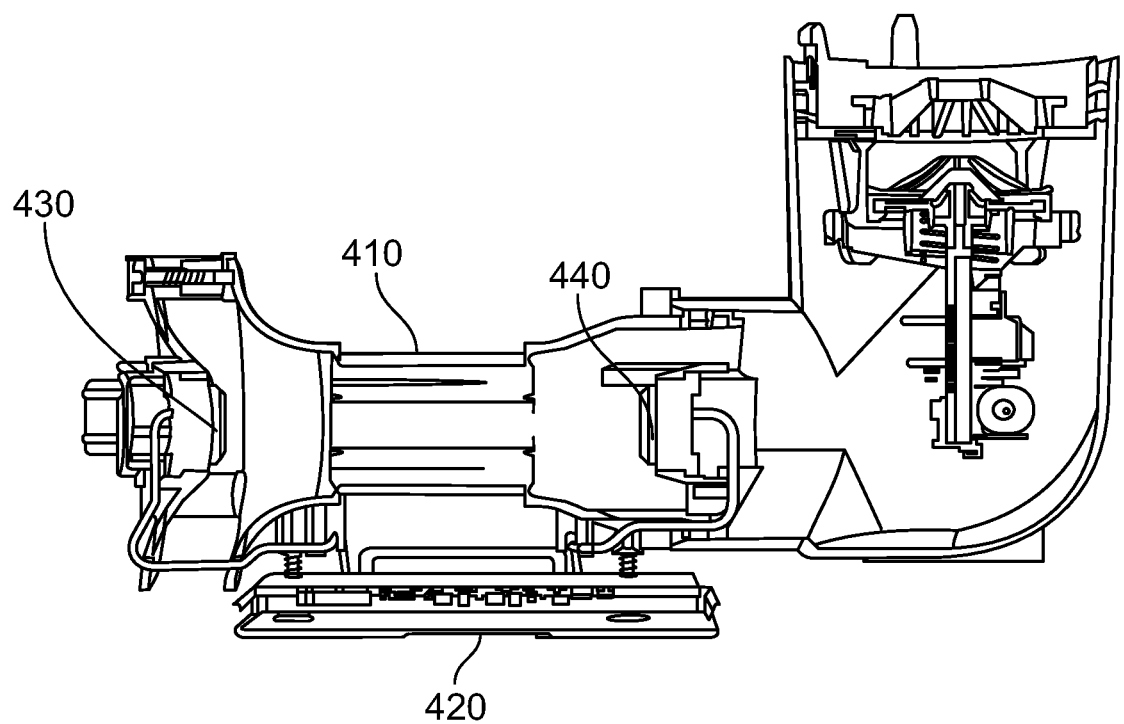
FIG. 4 illustrates a system in accordance with an embodiment of the invention.

In FIG. 4, a system 400 is illustrated that includes flow tube 410, microthermal sensor, pressure, temperature and a processor on the PCBA 420, first ultrasonic transducer 430, and second ultrasonic transducer 440. The flow sensor is here an ultrasonic measurement principle and in this case no additional ultrasonic sensor is required for the speed of sound detection. It will be determined by the time of flight measurement between the two transducers. The gas or gas mixture will pass by the first transducer 430 and into the flow tube 410. The time of flight measurement between first and second transducer 430, 440 will determine the flow velocity of the gas or gas mixture. In addition, the flow sensor 410, 430 and 440 will measure the volumetric or mass flow of the gas or gas mixture as well. In addition, the system will also determine the temperature (T) and pressure (p) of the gas or gas mixture. The gas or gas mixture will then flow within the flow tube 410 and into the outlet of the meter (not shown here).

Referring to FIG. 4, with using an ultrasonic flow measurement principle, the gas or gas mixture will also flow between the ultrasonic transducers 430, 440 and they will determine sound velocity (cs) of the gas or gas mixture. The transducers 430, 440 will transmit ultrasonic waves through the gas or gas mixture and the system will determine the time of flight. The time of flight measurement and the distance between the transducers 430, 440 will be used to calculate the sound velocity (cs) of the gas or gas mixture. In addition, a density (r) of the gas or gas mixture is correlated from the sound velocity (cs). The ultrasonic transducers 430, 440 will identify the sound velocity (cs) of the gas or gas mixture and the density (r) of the gas or gas mixture.

In FIG. 4, the microthermal sensor, the temperature and pressure sensor and a processor are positioned on the PCBA 420. The microthermal sensor on the PCBA 420 will be in an area with less flow or no flow of the gas or gas mixture. The microthermal sensor on the PCBA 420 will include a heater that will use one or several heating pulses in the gas or gas mixture. In addition, the microthermal sensor on the PCBA 420 will also include heat sensors that will determine the one or more temperatures of the gas or gas mixture. As the one or more temperatures of the gas or gas mixture are increasing or deceasing in relation to the heating pulse or pulses, the heat sensors will determine the various temperatures. The microthermal sensor will determine the thermal diffusivity (a) of the gas or gas mixture. When the one or more temperatures of the gas or gas mixture are in a steady state, the microthermal sensor will determine the thermal conductivity (l) of the gas or gas mixture. The microthermal sensor on the PCBA 420 will determine the thermal diffusivity (a) and thermal conductivity (l) of the gas or gas mixture. The microthermal sensor on the PCBA 420 will be in an area with reduced or no flow of the gas or gas mixture.

In FIG. 4, a processor will be connected to the microthermal sensor on the PCBA 420. In addition, a pressure and a temperature sensor will be connected to the processor on the PCBA 420. The processor will calculate an energy of the gas or gas mixture. The processor will calculate the energy of the gas or gas mixture based on a calorific value of the gas or gas mixture. Further, the processor will calculate the energy based on the temperature and pressure of the gas or gas mixture. The processor will also calculate the consumed energy based on the volume or mass flow that is determined by the flow measurement principle. The processor will also determine the gas quality of the gas or gas mixture. Specific quantities of the gas quality in relation to the calorific value of the gas or gas mixture are correlated from the density (r). The ultrasonic sensor 430, 440 will determine the speed of sound of the gas or gas mixture, which is used to correlate the density (r) of the gas or gas mixture. The specific quantities of the gas quality are also correlated from the thermal conductivity (l) and thermal diffusivity (a) of the gas or gas mixture. The microthermal sensor on the PCBA 420 will determine the thermal conductivity (l) and thermal diffusivity (a) of the gas or gas mixture. Accordingly, the processor will use the determined temperature, pressure, and the volume or mass flow and the determined calorific value to calculate the consumed energy of the gas or gas mixture. Further, the processor will use the determined density (r), thermal conductivity (l), thermal diffusivity (a) identified by the ultrasonic sensor 430, 440 and microthermal sensor on the PCBA 420 to determine the gas quality of the gas or gas mixture.

Figure 5:
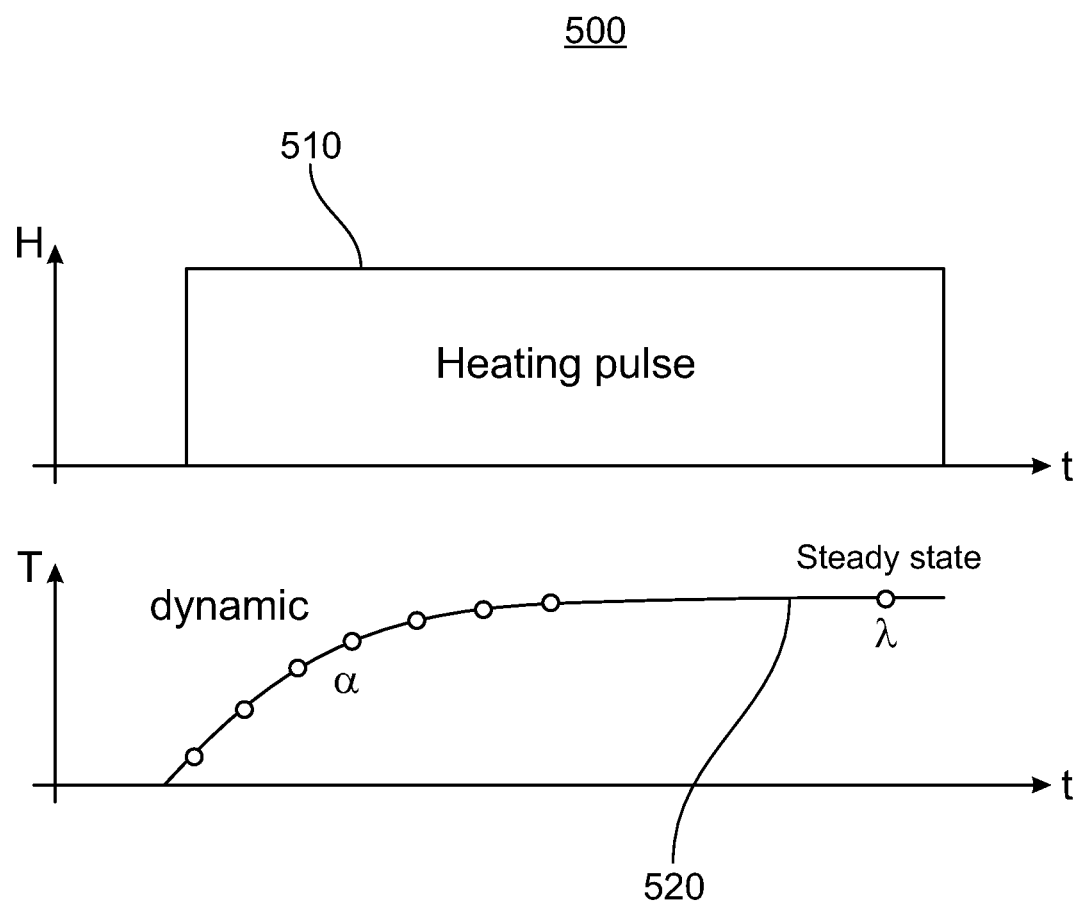
FIG. 5 illustrates a graph in accordance with an embodiment of the invention.

In FIG. 5, a graph 500 is illustrated that shows the heating pulse 510 that is applied to the gas or gas mixture in the microthermal sensor by the heating element of the microthermal sensor. The heating pulse 510 will enable the microthermal sensor to calculate the thermal diffusivity (a) of the one or more temperatures of the gas or gas mixture. In addition, the heating pulse 510 will also enable the microthermal sensor to identify the thermal conductivity (l) of the gas or gas mixture.

In FIG. 5, a graph 520 illustrating a dynamic state and steady state is shown. The microthermal sensor will identify the thermal diffusivity (a) of the gas or gas mixture when the one or more temperatures of the gas or gas mixture are in a dynamic state and in relation to the heating pulse. The temperatures will thereby in changing and increasing when they are in the dynamic state. When the temperatures are in a steady state, the microthermal sensor will identify the thermal conductivity (l) of the gas or gas mixture. Moreover, the temperatures are likely to remain constant when the temperatures are in the steady state. As such, the determined thermal diffusivity (a) and thermal conductivity (l) will enable the processor to determine the gas quality of the gas or gas mixture which is flowing through the flow tube.

Figure 6:
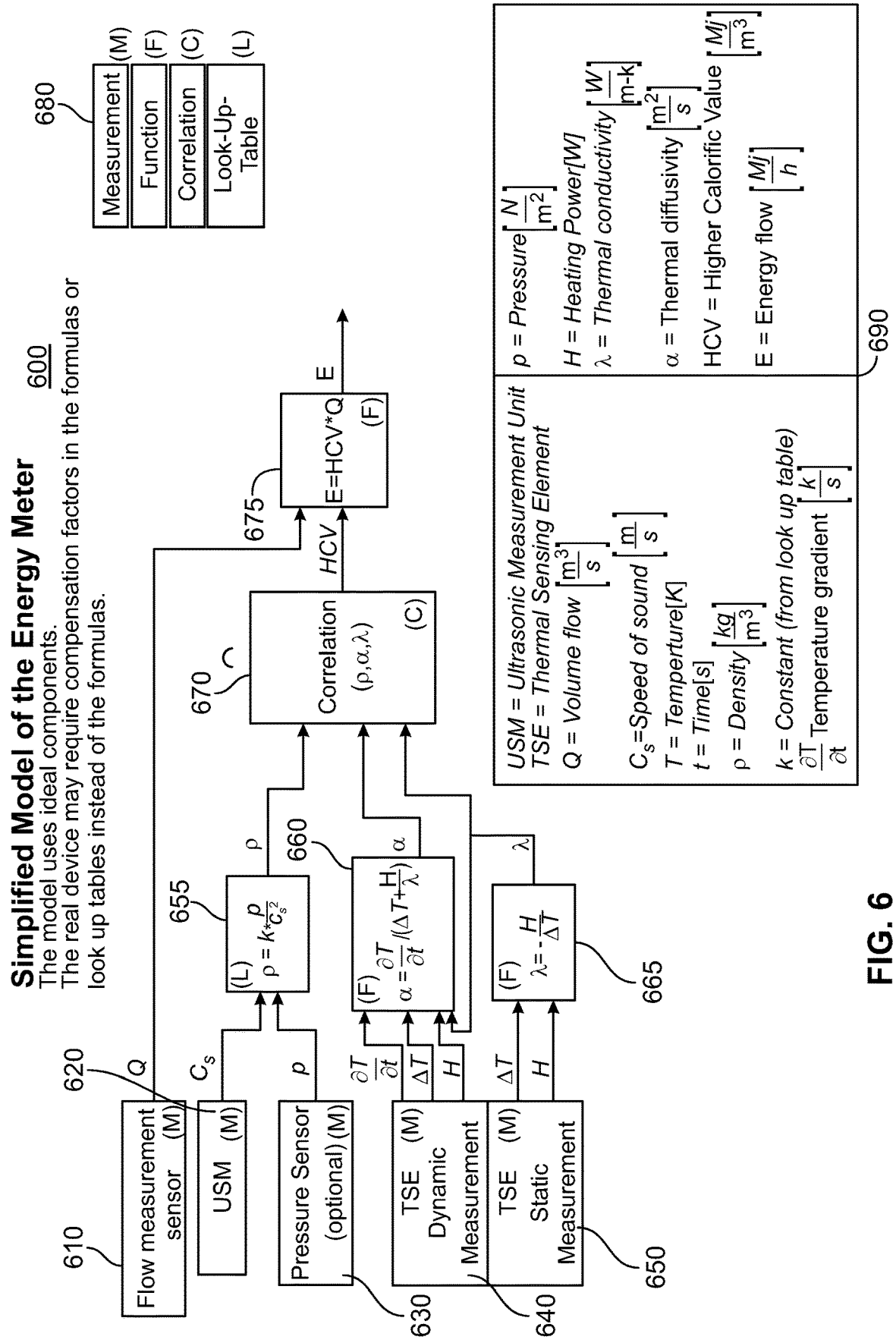
FIG. 6 illustrates a flow chart in accordance with an embodiment of the invention.

Referring to FIG. 6, model 600 of the energy meter is illustrated. The model 600 will include a flow measurement sensor 610 and an ultrasonic measurement sensor (USM) 620. The gas or gas mixture will flow through the flow measurement sensor 610 and the ultrasonic measurement sensor 620. The flow measurement sensor 610 will measure the volume or flow rate (Q) of the gas or gas mixture. The volume or flow rate (Q) will be used to determine the consumption of energy of the gas or gas mixture. The USM 620 will measure the sound velocity (cs) of the gas or gas mixture. The model 600 can optionally include a pressure sensor 630. The pressure sensor 630 can determine the pressure (p) of the gas or gas mixture. The determined pressure (p) and sound velocity (cs) will be used to determine the density (r) 655 of the gas or gas mixture.

Referring again to FIG. 6, the model 600 will include thermal sensing element 640. The thermal sensing element 640 in the dynamic state will measure the change in temperature based on the heating pulse of the heater (H) of the gas or gas mixture. The one or more temperatures of the gas or gas mixture will be in a dynamic state. As a result of the heating pulse, the temperatures of the gas or gas mixture will be changing. The thermal sensing element 640 will perform a dynamic measurement of the temperature of the gas or gas mixture. Moreover, the thermal sensing element 640 will determine the thermal diffusivity (a) 660 of the gas or gas mixture. In addition, the same thermal sensing element 650 in the static state is also shown. In the static or steady state, the change in temperature due to the heating pulse of the gas or gas mixture is not as likely to change. The change in temperature of the gas or gas mixture can be less or constant. The thermal sensing element will calculate the thermal conductivity (l) 665 of the gas or gas mixture in the steady state of the gas or gas mixture.

Still referring to FIG. 6, the calculated density (r) 655, thermal diffusivity (a) 660, and thermal conductivity (l) 665 are used for correlation 670. The processor can be positioned next to the thermal sensing element and perform the correlation 670. The correlation 670 will be used to identify the higher calorific value (HCV) of the gas or gas mixture. The consumed energy 675 will be calculated by multiplying the HCV to the volume flow of the gas or gas mixture. The processor calculates the energy 675 of the gas or gas mixture. Further, the processor can also use look-up tables, measurement functions and correlations 680 to calculate the HCV and energy 675 of the gas or gas mixture. Table 690 also illustrates the variables illustrated for energy meter model 600.

Referring again to FIG. 6, the model 600 can calculate the HCV and then the energy 675 of the gas or gas mixture based on parameters determined by the flow measurement sensor 610, USM 620, pressure sensor 630, and thermal sensing element (dynamic) 640, thermal sensing element (static) 650. The density (r) 655, thermal diffusivity (a) 660, and thermal conductivity (l) 665 will be determined and used to calculate the HCV. The HCV and volume flow (Q) will be used to calculate the consumed energy 675 of the gas or gas mixture. The gas quality of the gas or gas mixture will also be determined. Specific quantities of the gas or gas quality in relation to the HCV are correlated from the density (r) 655, thermal conductivity (l) 665, and thermal diffusivity (a) 660 of the gas or gas mixture.

Those skilled in the art will appreciate that the example embodiments are non-exhaustive and that embodiments other than that described here may be included without departing from the scope and spirit of the presently disclosed embodiments.

Summary

Overall, the features cited above provide advantages over previous systems. Only one measure device is needed to determine the energy and consumption of the gas or gas mixture. In addition, the energy measurement occurs near the customer and not far away. The thermal properties of the gas or gas mixture can be determined without flow occurring at the microthermal sensor. The microthermal sensor is positioned away from the flow of the gas or gas mixture, but can still determine the thermal properties of the gas or gas mixture.

Another advantage of the system is a more accurate measurement of the energy and gas quality of the gas or gas mixture. When hydrogen, LPG, or biogas is injected within the gas net, the energy and gas quality can still be determined accurately based on the methods described above. The construction benefits can enable part of the energy meter model to receive the flow of the gas or gas flow and determine the properties of the gas or gas mixture apart from the thermal properties. The developed ultrasonic sensor and flow sensor can be used to measure the flow of the gas or gas mixture and determine the various properties of the gas or gas mixture, while the microthermal sensor is away from the flow but can determine the thermal properties of the gas or gas mixture. The construction provides significant benefits in reduced costs.

In summary, only one measurement device is needed. The construction of the one measurement device provides significant benefits in reduced costs in determining the energy and gas quality of a gas or gas mixture.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A method comprising:
    receiving a gas or gas mixture flow through a flow tube of a flow sensor, wherein a flow velocity, volumetric or mass flow are determined and a temperature (T) and a pressure (p) of the gas or gas mixture are detected;
    determining a sound velocity ($c_s$) of the gas or the gas mixture by an ultrasonic sensor, wherein a density (r) of the gas or the gas mixture is correlated from the sound velocity ($c_s$) or is calculated with the pressure and the sound velocity ($c_s$);
    positioning a microthermal sensor in an area without flow of the gas or the gas mixture at the microthermal sensor, wherein a thermal conductivity ($\lambda$) of the gas or the gas mixture at one or more temperatures is determined with the microthermal sensor, and wherein a thermal diffusivity ($\alpha$) of the gas or the gas mixture at the one or more temperatures is determined with the microthermal sensor; and
    connecting a processor to the microthermal sensor to calculate an energy of the gas or the gas mixture based on a calorific value, the temperature, and the volumetric or mass flow, wherein specific quantities for gas quality in relation to the calorific value of the gas or the gas mixture are correlated from the density (r), the thermal conductivity ($\lambda$), and the thermal diffusivity ($\alpha$) of the gas or the gas mixture.

2. The method of claim 1, further comprising:
    using a flow sensor with an ultrasonic, thermal mass flow, or a mechanical measurement principle to measure the flow velocity or the volumetric flow of the gas or gas mixture.

3. The method of claim 1, wherein the sound velocity ($c_s$) determined by the ultrasonic sensor is converted to the sound velocity (cs) at standard temperature ($T_{norm}$).

4. The method of claim 1, wherein the density (r) determined by means of correlation is a standard density (r), and/or wherein the density (r) determined by means of correlation is converted with the temperature (T) and the pressure (p) of the gas or gas mixture to the density ($\rho$) under operating conditions.

5. The method of claim 1, further comprising:
    utilizing one or more heat sensors within the microthermal sensor to identify the one or more temperatures of the gas or gas mixture.

6. The method of claim 1, wherein the microthermal sensor identifies the thermal conductivity ($\lambda$) of the gas or gas mixture at one or more time intervals.

7. The method of claim 1, further comprising:
    identifying the thermal diffusivity ($\alpha$) of the gas or gas mixture as the one or more temperatures are increasing or decreasing in relation to a heating pulse.

8. The method of claim 1, further comprising:
    calculating, by the processor, specific quantities of a gas quality of the gas mixture based on a density (r), the thermal diffusivity ($\alpha$) and the thermal conductivity ($\lambda$) of the gas mixture.

9. The method of claim 1, further comprising:
    calculating, by the processor, specific quantities of a gas quality of the gas mixture based on a speed of sound, the temperature, the thermal diffusivity ($\alpha$) and the thermal conductivity ($\lambda$) of the gas mixture.

10. The method of claim 1, further comprising:
    calculating, by the processor, specific quantities of a gas quality of the gas mixture based on a speed of sound, the pressure, the temperature, the thermal diffusivity ($\alpha$) and the thermal conductivity ($\lambda$) of the gas mixture.

11. The method of claim 7, further comprising:
    calculating the thermal diffusivity ($\alpha$) of the gas mixture as the one or more temperatures are increasing or decreasing in relation to a heating pulse.

12. The method of claim 1, further comprising:
calculating the thermal conductivity ($\lambda$) of the gas mixture as the one or more temperatures are in a steady state.

13. The method of claim 1, further comprising:
calculating the thermal conductivity ($\lambda$) of the gas mixture as the one or more temperatures are in a state of a reduced temperature gradient after a temperature change with a higher temperature gradient.

14. The method of claim 1, wherein the flow sensor is of an ultrasonic measurement principle, wherein the sound velocity (cs) is determined by the flow sensor, wherein an additional sensor is not required to determine the sound velocity ($c_s$).

15. The method of claim 9, wherein the processor calculates the thermal diffusivity ($\alpha$) of the gas mixture based on a temperature gradient in relation to a heating pulse.

16. A system comprising:
a flow sensor receiving a gas or gas mixture flow through a flow tube of the flow sensor, wherein a flow velocity, volumetric or mass flow are determined and a temperature (T) and a pressure (p) of the gas or gas mixture are detected;
an ultrasonic sensor determining a sound velocity ($c_s$) of the gas or the gas mixture, wherein a density (r) of the gas or the gas mixture is correlated from the sound velocity ($c_s$) or is calculated with the pressure and the sound velocity ($c_s$);
a microthermal sensor positioned in an area without flow of the gas or the gas mixture at the microthermal sensor, wherein the flow through the microthermal sensor is not proportional to the flow through the flow sensor, wherein a thermal conductivity ($\lambda$) of the gas or the gas mixture at one or more temperatures is determined with the microthermal sensor, and wherein a thermal diffusivity ($\alpha$) of the gas or the gas mixture at one or more temperatures is determined with the microthermal sensor; and
a processor connected to the microthermal sensor to calculate an energy of the gas or the gas mixture based on a calorific value, the temperature, and a volume or mass flow, wherein specific quantities for gas quality in relation to the calorific value of the gas or the gas mixture is correlated from the density (r), the thermal conductivity ($\lambda$), and the thermal diffusivity ($\alpha$) of the gas or the gas mixture.

17. The system of claim 16, wherein the microthermal sensor identifies changes in temperature of the one or more temperatures in relation to the thermal diffusivity ($\alpha$) in relation to a heating pulse.

18. The system of claim 16, wherein the one or more temperatures of the gas or gas mixture measured by the microthermal sensor in relation to the thermal conductivity ($\lambda$) is in a steady state.

19. The system of claim 16, further comprising:
one or more heat sensors configured to identify changes in the one or more temperatures in relation to the thermal diffusivity ($\alpha$) in relation to a heating pulse.

20. The system of claim 16, wherein sensors connected with the processor determines variances in the gas quality of the gas or gas mixture.

* * * * *